United States Patent
Gess

(10) Patent No.: US 8,904,740 B2
(45) Date of Patent: Dec. 9, 2014

(54) METHOD AND APPARATUS FOR CHANGING A STRIP OF SEALED BAG PRECURSORS IN TO OPEN BAGS

(71) Applicant: Larry C. Gess, Palmyra, WI (US)

(72) Inventor: Larry C. Gess, Palmyra, WI (US)

(73) Assignee: Intertape Polymer Corp., Sarasota, FL (US)

( * ) Notice: Subject to any disclaimer, the term of this patent is extended or adjusted under 35 U.S.C. 154(b) by 0 days.

(21) Appl. No.: 13/963,431

(22) Filed: Aug. 9, 2013

(65) Prior Publication Data

US 2014/0053514 A1   Feb. 27, 2014

Related U.S. Application Data

(60) Provisional application No. 61/691,288, filed on Aug. 21, 2012.

(51) Int. Cl.
| | |
|---|---|
| *B65B 69/00* | (2006.01) |
| *B31B 1/00* | (2006.01) |
| *B32B 1/00* | (2006.01) |
| *B65B 43/26* | (2006.01) |

(52) U.S. Cl.
CPC ............ *B65B 69/00* (2013.01); *B31B 2219/14* (2013.01); *B65B 69/0033* (2013.01); *B31B 1/00* (2013.01); *B31B 2219/28* (2013.01); *B31B 2237/10* (2013.01); *B32B 1/00* (2013.01); *B65B 43/267* (2013.01)
USPC ......................................................... 53/492

(58) Field of Classification Search
CPC B65B 69/0033; B65B 69/00; B65B 69/0025; B65B 43/267; B32B 1/00; B43M 7/02; B43M 3/045; B43M 7/004; B31B 1/00; B31B 2237/10; B31B 2219/28; B31B 2219/14
See application file for complete search history.

(56) References Cited

U.S. PATENT DOCUMENTS

| | | | |
|---|---|---|---|
| 3,430,409 A | 3/1969 | Manfredonia et al. | |
| 3,754,370 A | 8/1973 | Hanson | |
| 4,023,470 A | 5/1977 | van der Meulen | |
| 4,284,221 A * | 8/1981 | Nagel et al. .................. | 225/100 |

(Continued)

FOREIGN PATENT DOCUMENTS

| | | |
|---|---|---|
| CA | 1052605 | 4/1979 |
| EP | 0072086 | 2/1983 |

(Continued)

OTHER PUBLICATIONS

International Search Report and Written Opinion, International Application No. PCT/US2013/054336 (Feb. 5, 2014).

*Primary Examiner* — Sameh Tawfik
(74) *Attorney, Agent, or Firm* — Thompson Hine L.L.P.

(57) ABSTRACT

Methods and apparatus for changing a strip of sealed bag precursors in to open bags are disclosed. The apparatus is referred to as a transforming or bag opening machine and includes a separation station and may include a perforation station and a piercing station. The perforation station forms a plurality of end perforations in the multiple layers of a strip of sealed bag precursors. The separation station separates the plurality of end perforations in at least one film layer of the trip to form a plurality of bag openings. The plurality of end perforation are torn by the separation station, which includes manipulating the rotation of a main roller, a pressure roller and at least one separation roller.

9 Claims, 7 Drawing Sheets

(56) References Cited

U.S. PATENT DOCUMENTS

| | | | |
|---|---|---|---|
| 4,336,681 A | 6/1982 | Onishi | |
| 4,688,708 A * | 8/1987 | Irvine et al. | 225/100 |
| 4,899,520 A | 2/1990 | Lerner et al. | |
| 5,172,537 A | 12/1992 | Wetter et al. | |
| 5,836,498 A * | 11/1998 | Turek | 225/1 |
| 5,862,968 A * | 1/1999 | Traise | 225/100 |
| 6,035,611 A | 3/2000 | Lerner | |
| 6,135,281 A | 10/2000 | Simhaee | |
| 6,178,725 B1 | 1/2001 | Sperry et al. | |
| 6,234,943 B1 * | 5/2001 | Copin | 493/11 |
| 6,379,292 B1 | 4/2002 | Simhaee | |
| 6,742,317 B2 | 6/2004 | Cronauer et al. | |
| 7,722,517 B2 | 5/2010 | Chen | |
| 7,836,670 B2 | 11/2010 | Cerf | |
| 7,874,509 B2 | 1/2011 | Kenney | |
| 8,307,862 B2 | 11/2012 | Williamson | |
| 2002/0117528 A1 * | 8/2002 | Turek | 225/4 |
| 2003/0046901 A1 | 3/2003 | Cronauer et al. | |
| 2003/0230052 A1 | 12/2003 | Rabiea | |
| 2006/0194684 A1 | 8/2006 | Tan | |
| 2009/0057478 A1 * | 3/2009 | Conner | 242/564 |
| 2009/0094946 A1 | 4/2009 | Trinko | |
| 2011/0124479 A1 | 5/2011 | Duwendag et al. | |
| 2012/0073246 A1 | 3/2012 | Riccardi et al. | |

FOREIGN PATENT DOCUMENTS

| | | |
|---|---|---|
| EP | 0449497 | 10/1991 |
| EP | 1106338 | 6/2001 |
| EP | 1667914 | 6/2006 |
| EP | 2230067 | 6/2013 |
| WO | 2005/032946 | 4/2005 |

* cited by examiner

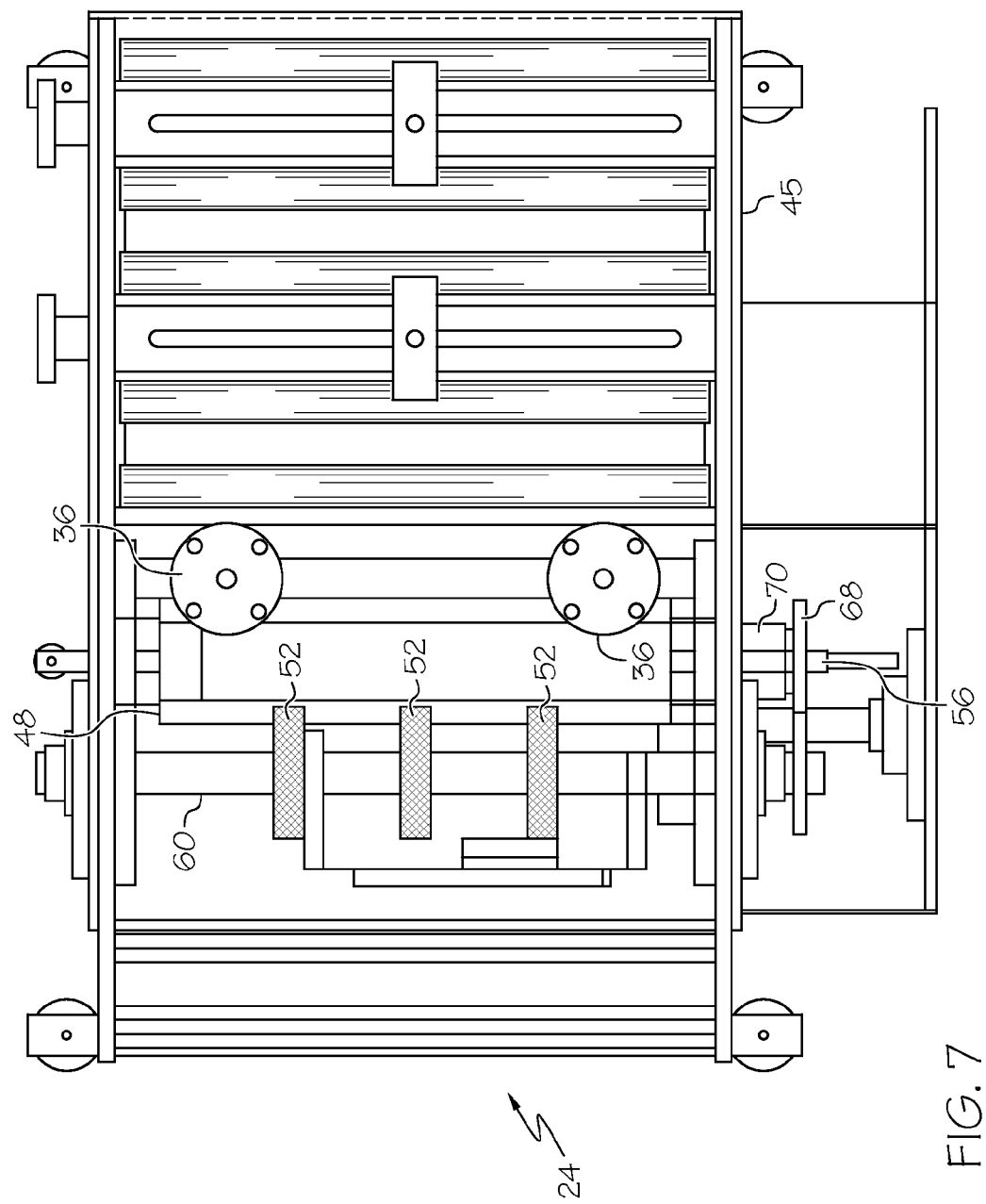

METHOD AND APPARATUS FOR CHANGING A STRIP OF SEALED BAG PRECURSORS IN TO OPEN BAGS

RELATED APPLICATIONS

This application claims the benefit of U.S. Provisional Application No. 61/691,288, filed Aug. 21, 2012, the entire contents of which are incorporated herein by reference in their entirety.

TECHNICAL FIELD

The present invention relates generally to bags for retaining a product and more specifically to a method and apparatus for changing a strip of sealed bag precursors, typically in the form of a roll thereof, into open bags. The apparatus may also feed the now open bags into a bag filling machine for sealing a product in individual bags.

BACKGROUND

It is well known in the art to supply a roll of pre-opened bags for sealing a product in a bag with a bag filling machine, such as disclosed in U.S. Pat. No. 6,742,317.

However, a roll of pre-opened bags has a diameter, which is about twice the size of a roll of sealed film without pre-openings in the bags. Air trapped in the pre-opened bags makes the roll twice the size of a roll of sealed film. The cost of a roll of pre-opened bags compared to a roll of unopened bags is about twice the cost.

The pre-opened bags are created by forming end perforations in the two layers of the film and separating the end perforations in one of the layers in a secondary operation to open the bags and rewinding the open bags on to a core to form a roll with the bags oriented in the proper direction for feeding into a bag filling machine. This additional step of rewinding the open bags requires additional time in the manufacturing process and as such is an added cost.

Accordingly, there is a clearly felt need in the art for a method and apparatus for making open bags in a manner that reduces the cost of the rolls of material and increases productivity of a bag sealing operation.

SUMMARY

The disclosed roll of sealed bag precursors and the transforming or bag opening machine meets this long felt need with many cost effective advantages. A roll of sealed bag precursors has more bags per roll, which reduces the amount of times a new roll has be placed in to the production line of a bag opening machine and hence a bag filling manufacturing process. This is advantageous to provide increased productivity as a results of less interruptions in the process. The initial manufacturing process of the roll of sealed bag precursors include less steps and can be accomplished faster and cheaper for passed on cost saving to the customer and enables the seller of the rolls of sealed bag precursors to supply a bag opening machine to a user at no cost to the user, even if the user has a lower production operation.

In one aspect, apparatus referred to as a transforming machine for changing a strip of sealed bag precursors in to open bags are disclosed. The apparatus includes a separation station and may include a perforation station and a piercing station. The perforation station forms a plurality of end perforations in the multiple layers of a strip of sealed bag precursors. The separation station separates the plurality of end perforations in at least one film layer of the trip to form a plurality of bag openings. The plurality of end perforation are torn by the separation station, which includes manipulating the rotation of a main roller, a pressure roller and at least one separation roller. The transforming machine also includes a drive motor operative coupled to the main drive roller and the separation roller. The pressure roller is operative coupled to a brake and the main drive roller is operative coupled to a clutch. The pressure roller is positioned relative to the main drive roller to squeeze a continuous strip of bag precursors therebetween, the separation roller is positioned relative to the main drive roller to squeeze the continuous strip of bag precursors therebetween, and a gap is defined between the pressure roller and the separation roller.

The transforming machine may also include a sensor configured for sensing transverse edge seals of the continuous strip of bag precursors and a controller electrically connected to the sensor, the brake, and the clutch. The controller, based on one or more signals from the sensor, is configured to calculate when perforations in one perforated bag precursor of the continuous strip will be located in the gap between the pressure roller and the separation roller and at that point in time signals the brake to activate and the clutch to disengage.

In another aspect, methods for changing a strip of sealed bag precursors in to open bags are disclosed. The methods may include providing a continuous strip of sealed bag precursors and a transforming machine having a perforation station and a separation station. The method then involves feeding the continuous strip of sealed bag precursors in to the transforming machine where the continuous strip experiences perforating and separating. The perforating includes forming a plurality of end perforations in multiple layers of each sealed bag precursor at the perforation station, thereby forming a perforated bag precursor. Separating includes tearing the plurality of end perforations in one of the multiple layers to create a bag opening at the separation station, thereby forming a continuous strip of open bags. Thereafter, the continuous strip of open bags may be dispensed in to a bag filling machine in a continuous process.

In one embodiment, the separation station includes a main drive roller, a pressure roller, at least one separation roller, and a drive system. The main drive roller includes a main shaft; the pressure roller includes a pressure shaft; and the at least one separation roller is retained on a separation shaft. The drive system includes a drive motor. The drive motor preferably drives a first drive gear through an endless transmission element, a drive pulley and driven pulley. The first drive gear is attached to the driven pulley. A main drive gear is attached to a main clutch and the main clutch is retained on the main shaft. The first drive gear drives the main drive gear through a second drive gear. A separation drive gear is attached to the separation shaft. The second drive gear drives the separation drive gear through a separation idler gear. The pressure shaft includes an electric brake for momentarily stopping the rotation of the pressure shaft. The bags on the bag strip are preferable opened in the following manner. The bag strip is first routed through the perforation station. The perforation blade forms an end perforation in the first and second film layers of the bag strip.

In another aspect, rolls of film that have a plurality of sealed bag precursors in a continuous strip wound to form the roll are disclosed. Each of the sealed bag precursors includes at least two layers of film sealingly connected to one another to define a sealed cavity therebetween. In one embodiment, each sealed bag precursor includes opposing machine direction edge seals and two transverse edge seals. These bag precursors need to be perforated and opened to form bags.

After the sealed bag precursors are perforated to form perforated bag precursors, the bag precursors can be opened to form bags. The opening of bag precursors may include providing a separation station that includes a main drive roller, a pressure roller, and a separation roller and rotating the main drive roller to move a strip of the bag precursors through the separation station. During movement through the separation station the bag strip is acted upon by squeezing the bag strip between the pressure roller and the main drive roller and squeezing the bag strip between the separation roller and the main drive roller. While this squeezing is occuring, separating the perforations includes disengaging the driving of the main drive roller for a period of time, and braking the pressure roller for this same period of time to tear existing end perforations in the bag strip apart to create a bag opening.

Each bag is opened when a main clutch is disengaged momentarily from the main drive roller and the pressure roller is momentarily braked with the electric brake. Travel of the first film layer adjacent the pressure roller will stop and the first film layer adjacent the separator roller will keep traveling with the result that the end perforation in the first layer is torn, producing an opening in the bag.

BRIEF DESCRIPTION OF THE DRAWINGS

FIG. 7 is a top view of the transforming machine of FIG. 5.

DETAILED DESCRIPTION

Figure 1:
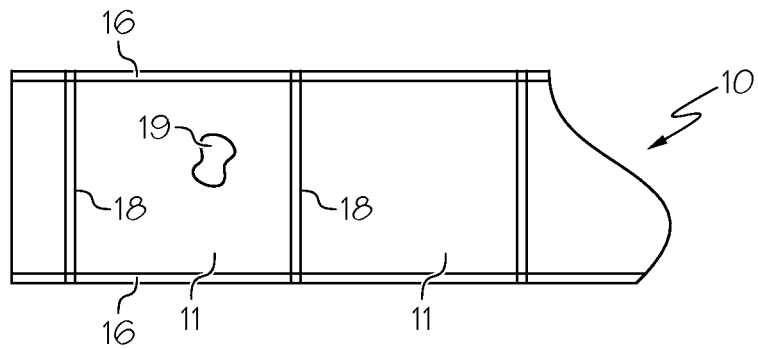
FIG. 1 is a top plan view of a strip of a plurality of bag precursors, having opposing machine direction edge seals.

The following detailed description will illustrate the general principles of the invention, examples of which are additionally illustrated in the accompanying drawings. In the drawings, like reference numbers indicate identical or functionally similar elements.

With reference now to the drawings, and particularly to FIG. 1, there is shown a top view of a strip 10 of a plurality of bag precursors 11, having opposing machine direction edge seals 16 (also called lengthwise edges herein) and a plurality of transverse seals 18 (also called end seals herein). In this embodiment, each bag precursor 11 has four edges defined by the machine direction edge seals and two transverse seals 18 joining a first film layer 12 to a second film layer 14 (best seen in FIG. 4) and defining a cavity 19 therebetween. Cavity 19 is empty in this embodiment such that substantially no air is present between the first film layer 12 and the second film layer 14 to maximize the amount of the strip 10 that can be stored on a roll, i.e., the number of bag precursors 11 on a roll, such as roll 23 in FIG. 5.

Figure 2:
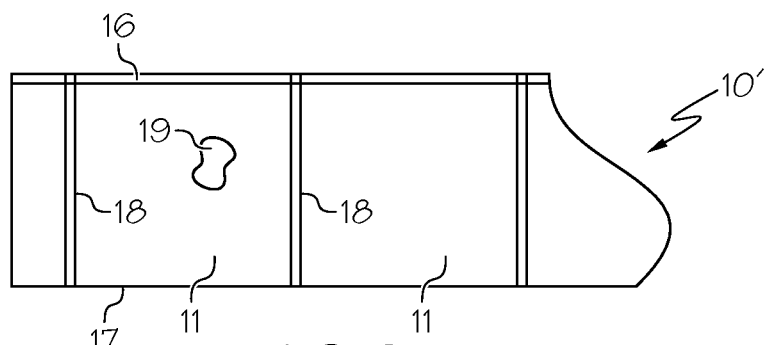
FIG. 2 is a top plan view of a strip of a plurality of sealed bag precursors, having one machine direction edge seal and one machine direction folded edge.

FIG. 2 is an another embodiment of a strip, generally designated by the reference number 10', of a plurality of bag precursors 11. Here, the strip 10' only includes three seals because one machine direction edge is a fold 17 in a continuous piece of film that after folding defines the first film layer 12 and the second film layer 14 (best seen in FIG. 4). In this embodiment, each bag precursor 11 includes a machine direction edge seal 16 opposing the fold edge 17 and has two transvers seals 18 joining the first film layer 12 to the second film layer 14 and defining a cavity 19 therebetween. Cavity 19 is empty such that substantially no air is present between the first film layer 12 and the second film layer 14 to maximize the amount of the strip 10 that can be stored on a roll, such as roll 23 in FIG. 5.

Figure 3:
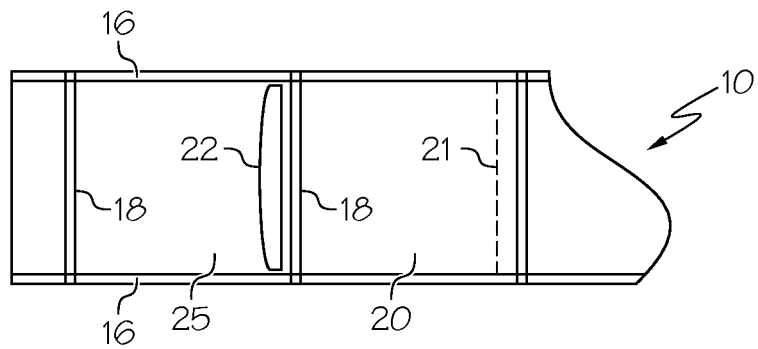
FIG. 3 is a top view of the bag strip of FIG. 1 after a perforation process and an opening process.

With reference to FIG. 3, the strip 10 from FIG. 1 is shown after end perforation 21 is formed in one of the bag precursors thereby forming a perforated bag precursor 20, and after one such end perforation has been opened thereby forming a bag opening 22. The strips 10, 10' are first made as set forth above to have a plurality of seals 16, 18 to define a continuous strip of bag precursors 11 and through a method transforms the bag precursors into open bags 25. The method includes forming end perforations 21 in the first and second film layers 12, 14; and separating the end perforations 21 to form bag openings 22 in a transforming machine 24.

Figure 5:
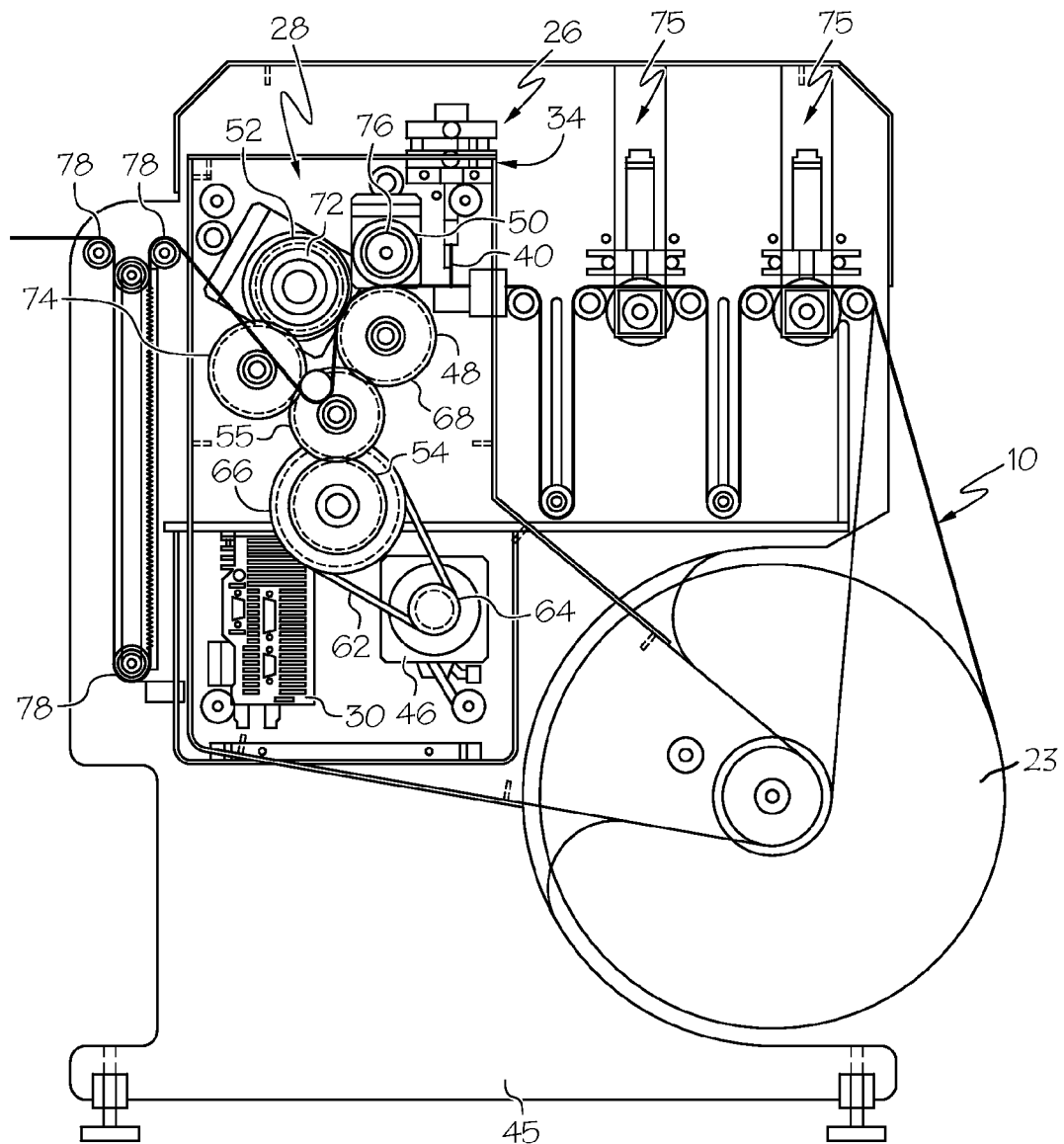
FIG. 5 is a side cross sectional view of a bag opening or transforming machine.

A first embodiment of the transforming machine 24 is illustrated in FIGS. 5-9. As seen in FIG. 5 and the enlarged portion thereof shown in FIG. 6, the transforming machine 24 includes a perforation station 26, a separation station 28, and at least one piercing station 75. The perforation station 26 forms the plurality of end perforations 21 in the first and second film layers 12, 14 of the bag strip 10, or more specifically into a bag precursor 11 (FIGS. 1-3). The separation station 28 opens the bag opening 22 in the perforated bag precursor 20. A piercing station 75 pieces holes in the bag strip, or more specifically into a bag precursor. The embodiment in FIG. 5 includes two piercing stations 75 and the embodiment in FIG. 11 includes one piercing station 75. Additional piercing stations 76 may optionally be added in the transforming machine 24' or connected thereto as needed as represented by the dashed box in FIG. 11.

Figure 6:
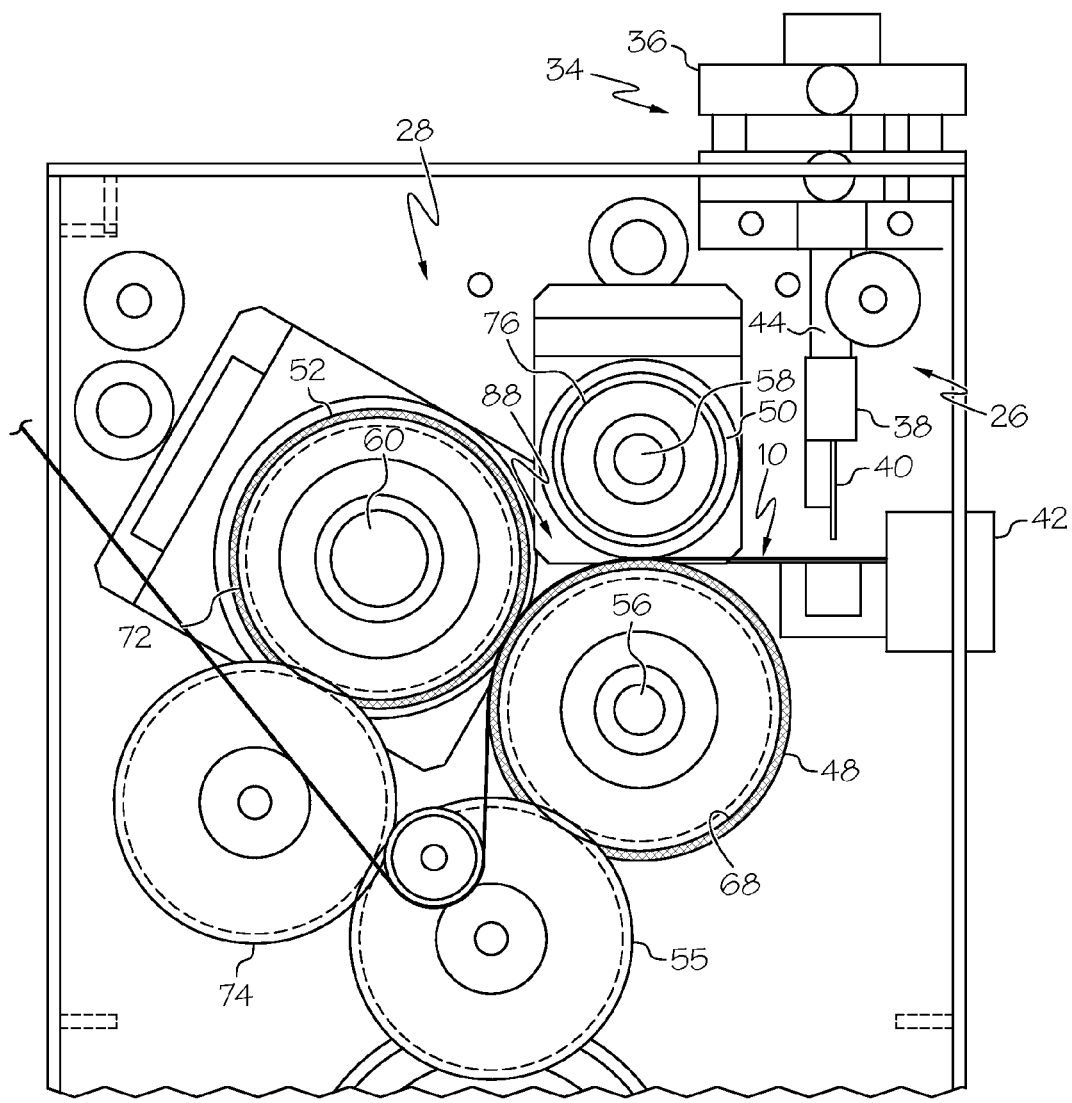
FIG. 6 is an enlarged side cross sectional view of a perforation station and a separation station of the transforming machine of FIG. 5.
Figure 9:
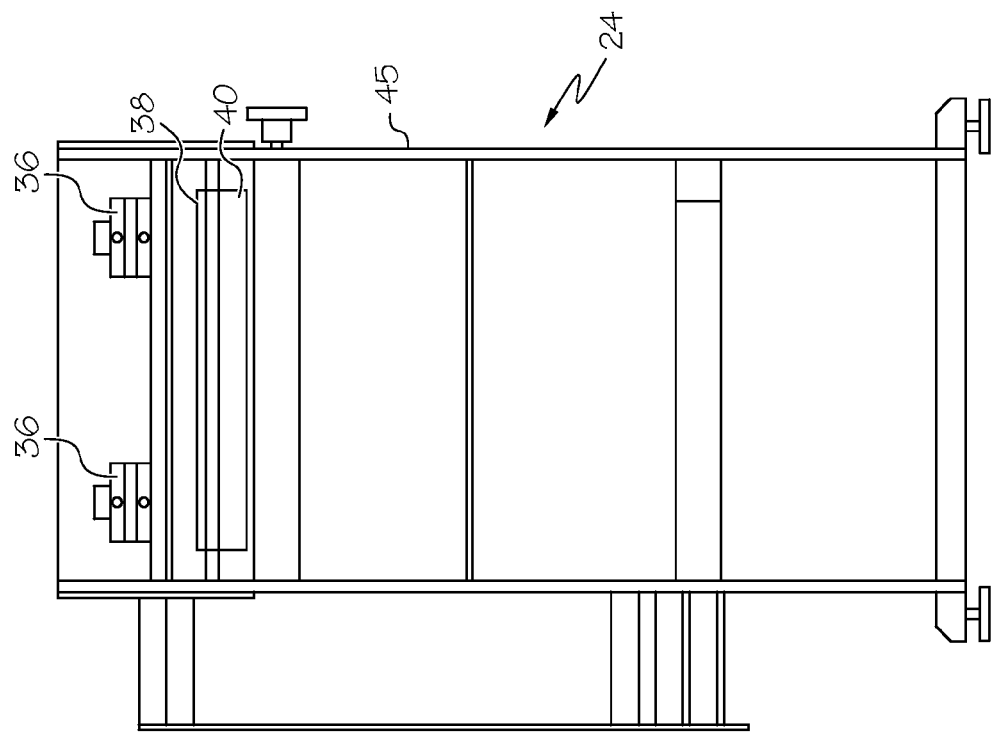
FIG. 9 is a rear view of the transforming machine of FIG. 5.

The perforation station 26 in FIGS. 5 and 6 may include a vertically actuated perforation device 34 or a rotary perforation device (not shown). The vertically actuated perforation device 34 preferably includes at least one actuation device 36, a blade holder 38, a perforation blade 40 and an electronic eye 42 (label in FIG. 6). The actuation device 36 is preferably a pneumatic cylinder, but other suitable actuation devices may also be used. The actuation device 36 includes an actuation rod 44 to which the blade holder 38 is attached. The perforation blade 40 is typically removably attachable to the blade holder 38. The electronic eye 42 senses the location of the end seals 18.

The transforming machine 24 also include an electronic controller 30. The electronic controller 30 receives an electrical signal from the electronic eye 42 and actuates the at least one actuation device 36 according to a parameter, such as a period of time programmed into the electronic controller 30. The electronic controller 30 also momentarily stops the rotation of a drive motor 46, which stops the forward movement of the strip 10 or 10', such that the end perforations 21 are perpendicular to a length of the bag strip 10, 10', i.e., are transverse to the machine direction.

The separation station 28 of FIGS. 5-6 separates the plurality of end perforations 21 in the first film layer 12 of the bag strip 10 to form the plurality of bag openings 22. The separation station 28 in this embodiment includes a base frame 45, a main drive roller 48, a pressure roller 50, at least one separation roller 52, a first drive gear 54 a second drive gear 55 and the drive motor 46. The main drive roller 48 includes a main shaft 56; the pressure roller 50 includes a pressure shaft 58; and the one or more separation rollers 52 are retained on a separation shaft 60. The main shaft 56, the pressure shaft 58 and the separation shaft 60 are rotatably retained in the base frame 45 and the main shaft 56 and the separation shaft 60 are driven by drive motor 46.

The drive motor 46 as seen in FIG. 5 drives the second drive gear 55 through an endless transmission element 62 (such as a belt or chain), a drive pulley 64, a driven pulley 66 and the first drive gear 54. The first drive gear 54 is attached to the driven pulley 66 being driven by the endless transmission element 62 for rotation therewith. The first drive gear 54 drives the second drive gear 55 and the second drive gear 55 drives the main drive gear 68 of the main drive roller 48. A separation drive gear 72 is attached to the separation shaft 60 of the separation roller 52. The second drive gear 55 also drives the separation drive gear 72 (and hence the separation roller 52) through a separation idler gear 74.

Still referring to FIGS. 5-6, the pressure shaft 58 includes an electric brake 76 for momentarily stopping the rotation of the pressure shaft 58 and hence the pressure roller 50. The electronic controller 30 activates the electric brake 76 when the end perforations 21 are located in a gap defined between the pressure roller 50 and the one or more separation rollers 52.

Figure 8:
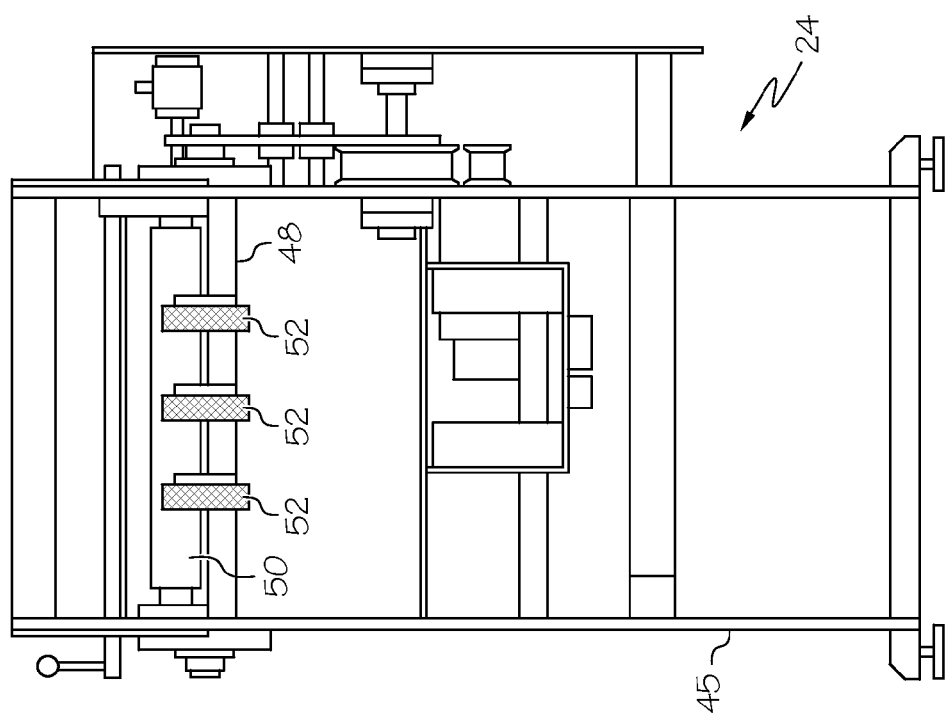
FIG. 8 is a front view of the transforming machine of FIG. 5.

Referring now to FIG. 7, a main drive gear 68 is attached to a main clutch 70 (shown in FIG. 7). The main clutch 70 is retained on the main shaft 56 which supports the main drive roller 48. In this view of the transforming machine 24 and in FIG. 9, three separation rollers 52 are visible. These drawings are merely one example embodiment and it is understood that there can be one, two, three or more separation rollers 52 on the separation shaft 60. FIG. 7 and FIG. 8 also illustrate that there may be more than one actuation device 36 for actuating the perforation device 34. While two actuation devices 36 are shown, the transforming machine 24 is not limited thereto.

Figure 4:
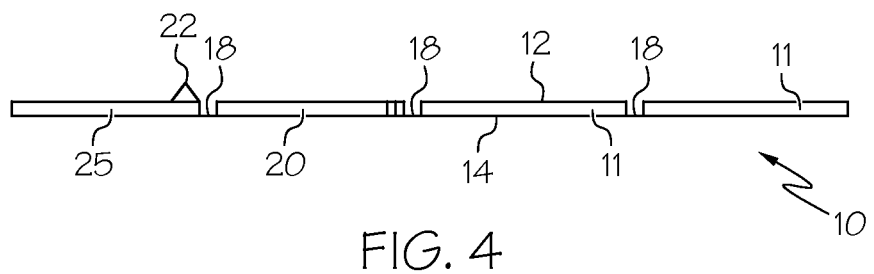
FIG. 4 is a side view of a portion of the bag strip of FIG. 3.

The unopened, perforated bag precursors 20 on the bag strip 10, illustrated in FIGS. 3 and 4, are perforated and opened in the following manner using the transforming machine 24 or 24' of FIGS. 5 and 11. The bag strip 10 is first routed through the perforation station 26. The perforation blade 40 forms the end perforations 21 in the first and second film layers 12, 14 of the bag strip 10. If the vertically actuated perforation device 34 is used to create the end perforations, the drive motor 46 is stopped momentarily to create the end perforation 21. If a rotary perforation device is used, the drive motor 46 is not stopped.

The bag strip 10 is then routed through the separation station 28. The bag strip 10 is squeezed between the pressure roller 50 and the main drive roller 48. The bag strip 10 is also squeezed between the separation roller 52 (or a plurality thereof) and the main drive roller 48. Each unopened, perforated bag precursor 20 is opened when the main clutch 70 (shown in FIG. 7) is disengaged momentarily from the main drive gear 68; the pressure roller 50 is braked with the electric brake 76; and when the end perforations 21 are located in a gap 88 between the pressure roller 50 and the at least one separation roller 52. Travel of the first film layer 12 adjacent the pressure roller 50 will stop as a result of the electric brake 76 and the first film layer 12 adjacent the separator roller 52 will keep traveling with the result that the end perforations 32 in the first film layer 32 are torn, producing a bag opening 22 in the bag 20. The bag strip 10 is finally taken-up by a plurality of take-up rollers 78.

The location of the bag strip 10 in the gap 88 between the pressure roller 50 and the separation roller 52 may be known by an electronic controller 30. The electronic controller 30 calculates the position of the end perforations 21 by sensing the end seals 18 and knowing the speed of the bag strip 10 through the machine 24.

Figure 10:
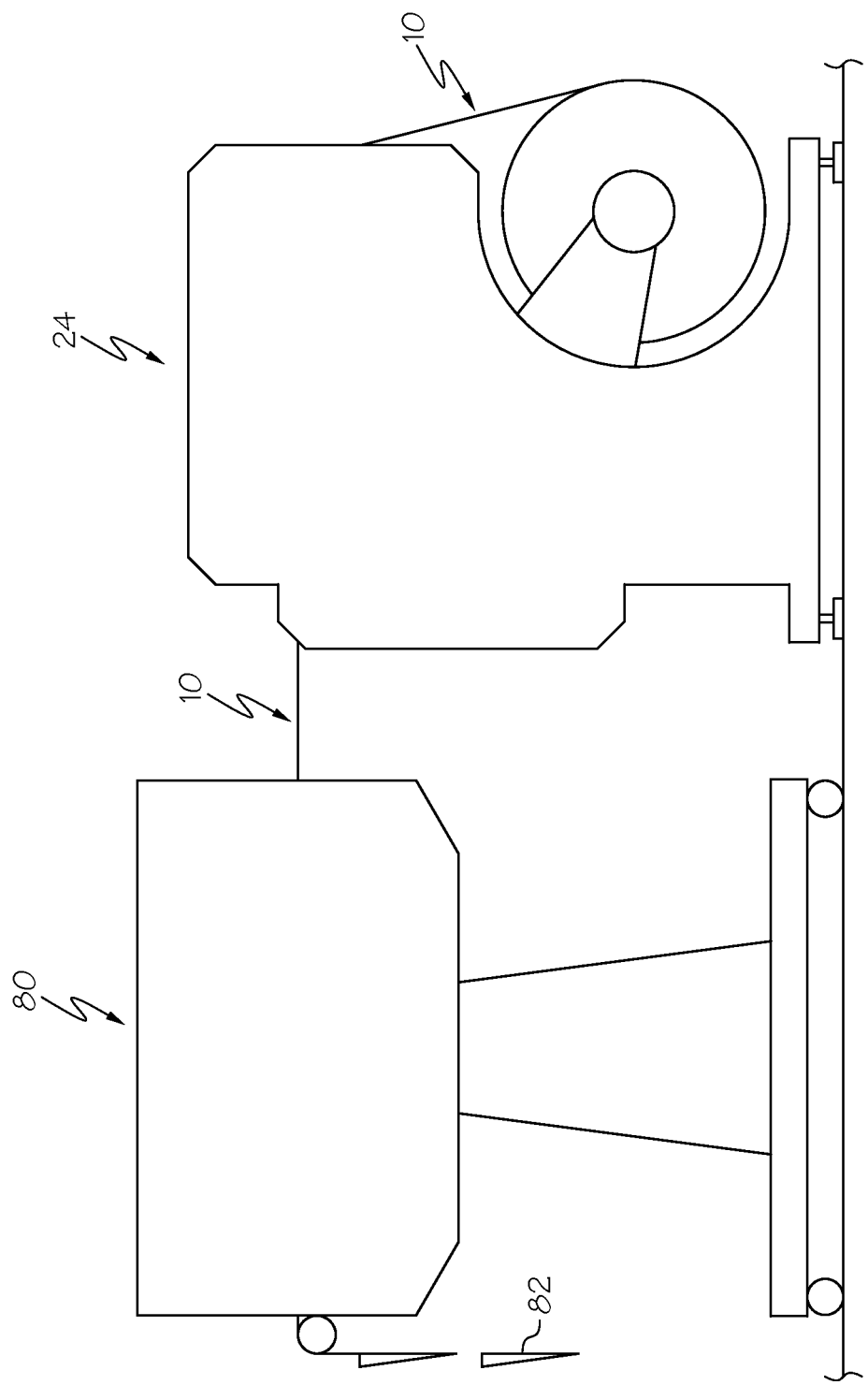
FIG. 10 is a side view of a bag opening or transforming machine feeding a bag filling and sealing machine.

With reference to FIG. 10, a bag filling machine 80 is fed with the bag strip 10 from the transforming machine 24. As seen in the figure, the strip 10 is exiting the transforming machine 24, which will have opened the bag precursors or perforated and opened the bad precursors as described above. The bag filling machine 80 may be any suitable commercially available device. A product is inserted into each bag opening 22 in the bag strip 10; the bag opening 22 is sealed; and the end perforation 21 in the second film layer 14 cut to produce a sealed bag 82.

Figure 11:
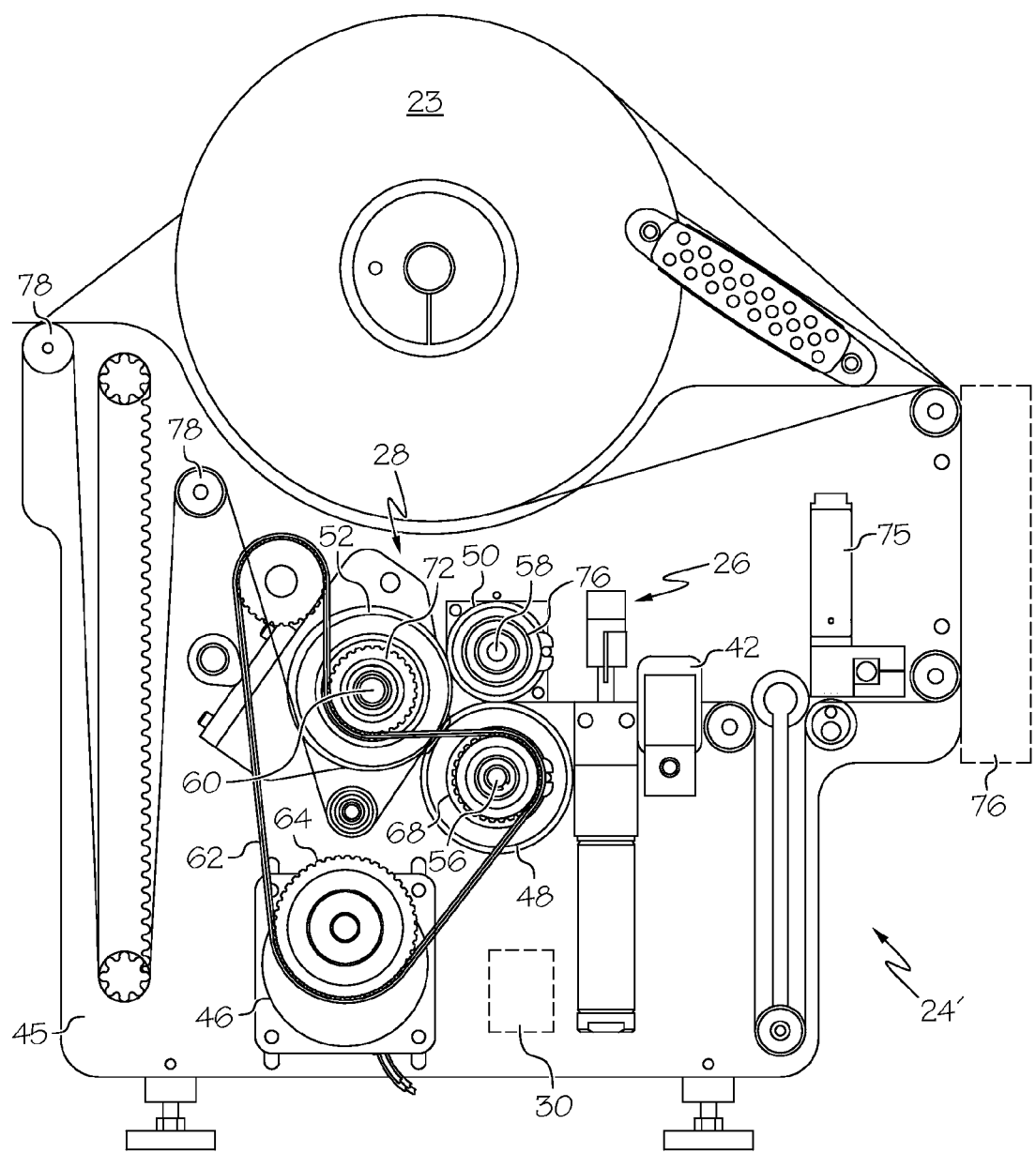
FIG. 11 is a side cross sectional view of an alternate embodiment of a bag opening or transforming machine.

Referring now to FIG. 11, an alternate embodiment of a transforming machine designated by the reference number 24' is illustrated. The transforming machine 24' includes many of the same components as the transforming machine 24 of FIGS. 5-9 and like reference numbers are used for similar components. As see in FIG. 11, the transforming machine 24 may include an optional piercing station 76, does include a piercing station 75, a perforating station 26, and a separating station 28 mounted to a base frame 45. These components of the transforming machine 24' operate as described above with respect to FIGS. 5-9. The primary difference in this embodiment is the gearing and connection of the separation station's main drive roller 48, specifically its main drive gear 68, and the separation roller 52, specifically its separation gear 72 to the drive motor 46. Here, the drive motor 46 includes a drive gear 64 having an endless transmission element 62 entrained thereabout and about a driven gear 54 and in operative connection to the main drive gear 68 and the separation drive gear 72. The main drive gear 68 is connected to a main drive shaft 56 upon which the main drive roller 48 is mounted so that the drive gear 68 can rotate the main drive shaft 56 and hence rotate the main drive roller 48. Similarly, the separation drive gear 72 is connected to a separation shaft 60 upon which the separation roller 52 (or a plurality thereof) is mounted so that the separation drive gear 72 can rotate the separation shaft 60 and hence rotate the separation roller 52. One other difference it the position of the roll 23 of bag precursors 11. Here, the roll 23 is positioned above the main body of the transforming machine 24' and is fed down and into the first station, which in FIG. 11 is the piercing station 75.

While particular embodiments of the invention have been shown and described, it will be obvious to those skilled in the art that changes and modifications may be made without departing from the invention in its broader aspects, and therefore, the aim in the appended claims is to cover all such changes and modifications as fall within the true spirit and scope of the invention.

I claim:

1. A transforming machine for changing a strip of bag precursors in to a strip of open bags comprising:
   a drive motor;
   a separation station comprising:
      a main drive roller having a clutch controlling the rotation thereof, the main drive roller being rotatably driven by the drive motor when the clutch is in an engaged position;

a separation roller rotatably driven by the drive motor; and a pressure roller having a brake that stops the rotation thereof, wherein the pressure roller is positioned relative to the main drive roller to squeeze a continuous strip of bag precursors therebetween, the separation roller is positioned relative to the same main drive roller to squeeze the continuous strip of bag precursors therebetween, and a gap is defined between the pressure roller and the separation roller;

a sensor sensing transverse edge seals of the continuous strip of bag precursors when the continuous strip of bag precursors is present in the transforming machine; and a controller electrically connected to the sensor, the brake, and the clutch;

wherein the controller, based on one or more signals from the sensor, determines when perforations in one perforated bag precursor of the continuous strip is located in the gap between the pressure roller and the separation roller and at that point in time signals the brake to activate thereby stopping the rotation of the pressure roller and signals the clutch to disengage thereby disengaging the main drive roller from the drive motor, while the drive motor continues to drive the rotation of the separation roller, thereby separating the perforations in a first film layer, but not the perforations in a second film layer, of the continuous strip of bag precursors.

2. The transforming machine of claim 1, further comprising a perforation station having a perforation device and the sensor.

3. The transforming machine of claim 2, wherein the perforation device includes a rotary actuated blade or a vertically actuated blade and an actuation device to move the blade.

4. The transforming machine of claim 1, further comprising an endless transmission element transmitting driving power from the motor to both the main drive roller and the separation roller.

5. The transforming machine of claim 4, wherein the endless transmission element is engaged with a motor drive gear driven by the drive motor, a separation drive gear mounted on a shaft of the separation roller, and a main drive gear mounted on a shaft of the main drive roller.

6. The transforming machine of claim 5, further comprising a driven gear engaged to the endless transmission element.

7. The transforming machine of claim 4, wherein the endless transmission element drives a drive gear that directly drives at least one of a main drive gear mounted on a shaft of the main drive roller or a separation drive gear mounted on a shaft of the separation roller and indirectly drives the other.

8. The transforming machine of claim 1, further comprising a holder for a roll of the continuous strip of bag precursors positioned to feed the continuous strip of bag precursors upward into the transforming machine.

9. The transforming machine of claim 1, further comprising a holder for a roll of the continuous strip of bag precursors positioned to feed the continuous strip of bag precursors downward into the transforming machine.

\* \* \* \* \*